US007720350B2

(12) United States Patent
Surline

(10) Patent No.: US 7,720,350 B2
(45) Date of Patent: May 18, 2010

(54) METHODS AND SYSTEMS FOR CONTROLLING TRICK MODE PLAY SPEEDS

(75) Inventor: Jack E. Surline, Langhorne, PA (US)

(73) Assignee: General Instrument Corporation, Horsham, PA (US)

( * ) Notice: Subject to any disclaimer, the term of this patent is extended or adjusted under 35 U.S.C. 154(b) by 1063 days.

(21) Appl. No.: 10/999,670

(22) Filed: Nov. 30, 2004

(65) Prior Publication Data

US 2006/0117357 A1  Jun. 1, 2006

(51) Int. Cl.
*H04N 5/76* (2006.01)
(52) U.S. Cl. ...................................................... 386/68
(58) Field of Classification Search .................. 386/68, 386/69, 70, 6, 7, 724–726, 111, 124–126
See application file for complete search history.

(56) References Cited

U.S. PATENT DOCUMENTS

| 6,654,539 B1 * | 11/2003 | Duruoz et al. ................. 386/68 |
| 2004/0008770 A1 * | 1/2004 | Okada et al. ........... 375/240.02 |
| 2004/0223734 A1 * | 11/2004 | Lin et al. ...................... 386/68 |
| 2004/0264924 A1 * | 12/2004 | Campisano et al. ........... 386/68 |

FOREIGN PATENT DOCUMENTS

| JP | 2003-59235 A | * | 2/2003 |
| WO | WO 00/30358 A1 | * | 5/2000 |
| WO | WO 2004/014073 | * | 2/2004 |

OTHER PUBLICATIONS

Colin Davies, Kevin Murray; "Buy a PVR, Get One Free: Serving Trick Modes to Conventional STBS"; IBC 2003 Conference Papers; UK; www.broadcastpapers.com/IBC2003papers/ibc03NDSPVRFree04.htm.
Nick Kingsbury; "The MPEG Standard"; Connexions—Rice University; http://cnx.rice.edu/content/m11144/latest.

* cited by examiner

*Primary Examiner*—David E Harvey
(74) *Attorney, Agent, or Firm*—Larry T. Cullen

(57) ABSTRACT

In one of many possible embodiments, a method is provided for controlling trick mode playback speed. Frame indices associated with video frames of a digital video stream are monitored and a Group-of-Pictures (GOP) size is determined from the frame indices. One or more trick mode play speed parameters are calculated based on the determined GOP size. Presentation of the video frames is controlled based on the calculated trick mode play speed parameters. In one embodiment, the trick mode play speed parameters include a frame-skip count (FSC) and a frame-repeat count (FRC).

41 Claims, 4 Drawing Sheets

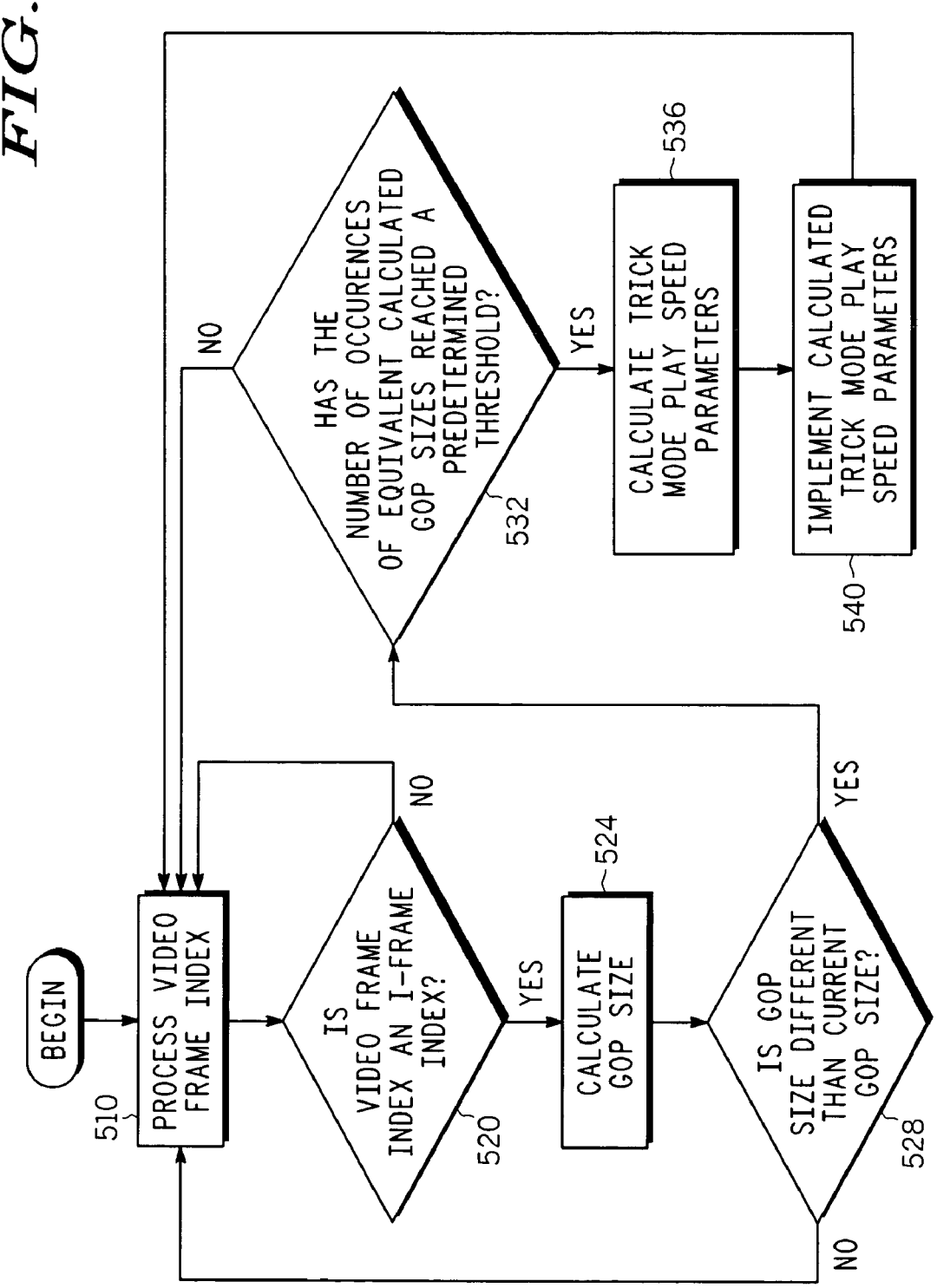

METHODS AND SYSTEMS FOR CONTROLLING TRICK MODE PLAY SPEEDS

FIELD

The present methods and systems relate to trick mode playback of digital video. More specifically, the present methods and systems provide for dynamically controlling trick mode playback speeds.

BACKGROUND

Digital video recorders (DVRs) (also known as personal video recorders (PVRs)) provide flexible features for recording and playing back audiovisual programming (e.g., television programs). DVR users are able to record programming content to hard disc drives (HDDs) and later play back the recorded content as desired. Because the content being played back is accessed from a local data store, DVR users are able to fast-forward, rewind, pause, and skip programming content. Further, DVR users are able to view content in slow motion, or even rapidly jump forward or backward though the content to desired points in programs. Such DVR playback features are commonly referred to as trick play modes and allow DVR users to play back recorded programs at selected speeds in forward or reverse directions.

The programming content recorded and played back by DVRs is typically in the form of Motion Pictures Expert Group Two (MPEG-2) streams (e.g., program or transport streams), which carry video content in sequentially ordered picture frames commonly referred to as elementary video streams. The picture frames include several different types of picture frames, such as I, B, and P frames. In MPEG-2 video streams, B and P type frames are positioned between I-frames to form groups of frames known as Groups of Pictures (GOPs). A GOP typically includes an I-frame and sequentially subsequent B and P frames up to the next I-frame in the video stream (e.g., see (250) of FIG. 2). The number of frames in a GOP defines the size, or length, of the GOP.

Of I, B, and P picture frames, only the video data content of I-frames can be reconstructed independently of other picture frames. Several trick play modes, referred to as I-frame trick modes, utilize this attribute of I-frames by processing and displaying only the I-frames of an MPEG-2 video stream. That is, DVRs utilizing I-frame trick play modes present only the video content contained in the I-frames for display during I-frame trick mode playback. Because I-frames make up only a small portion of the total frames in MPEG-2 video streams, I-frame trick play modes enable high-speed playback functions (e.g., high-speed fast forward or rewind), as well as functions for jumping forward or backward over large amounts of recorded programming content.

However, conventional I-frame trick play modes cannot maintain a selected playback speed when the GOP size varies during trick mode playback. Unfortunately, many different events can cause GOP size to vary within MPEG-2 video streams. For example, transitions of programming content from high-definition (HD) content to standard-definition (SD) content (and vice versa) are common occurrences that cause GOP sizes to vary. Further, the insertion of commercials into programming content can also cause GOP sizes to change.

As a result, when a recorded MPEG-2 video stream is played back with an I-frame trick mode, any changes in GOP size during playback undesirably causes the selected trick mode playback speed to vary. For example, if a viewer selects a trick mode play speed of fifteen times (15×) normal speed, playback speed parameters are typically set based on the GOP size of the first GOP to be played back in the trick mode. If the GOP size changes during playback, the trick mode play speed will not be maintained at 15×, which can cause a host of problems, including unpredictable quality of service (QoS) levels. For example, a user may easily have a negative experience if the selected trick mode playback speed drastically changes without any user input. Such negative experiences may be intensified by the presence of an on-screen playback progress bar, which provides a graphical representation of the selected trick mode type, the playback location in a recorded program, and the speed at which the recorded program is being traversed by the selected trick play mode. Thus, it would be desirable to maintain trick mode play speeds, especially when GOP size varies during trick mode playback.

SUMMARY

The present methods and systems provide for dynamically controlling trick mode playback speeds. In one of many possible embodiments, a method is provided for controlling trick mode playback speed. Frame indices associated with video frames of a digital video stream are monitored and a Group-of-Pictures (GOP) size is determined from the frame indices. One or more trick mode play speed parameters are calculated based on the determined GOP size. Presentation of the video frames is controlled based on the calculated trick mode play speed parameters. In one embodiment, the trick mode play speed parameters include a frame-skip count (FSC) and a frame-repeat count (FRC).

BRIEF DESCRIPTION OF THE DRAWINGS

The accompanying drawings illustrate various embodiments of the present methods and systems and are a part of the specification. Together with the following description, the drawings demonstrate and explain the principles of the present methods and systems. The illustrated embodiments are examples of the present methods and systems and do not limit the scope thereof.

FIG. 5 is a flowchart illustrating a method for controlling trick mode play speeds, according to one embodiment.

Throughout the drawings, identical reference numbers designate similar, but not necessarily identical, elements.

DETAILED DESCRIPTION

I. Introduction

The present specification describes methods and systems for dynamically controlling playback speeds of digital video trick play modes. In particular, playback speeds are dynamically controlled by setting playback speed parameters (e.g., frame repeat count (FRC) and/or frame skip count (FSC)) based on determined Group-of-Picture (GOP) sizes, as discussed below. This enables the maintaining of selected trick play mode playback speeds even when GOP size changes during trick mode playback.

In the following description, for purposes of explanation, numerous specific details are set forth in order to provide a thorough understanding of the present methods and systems for controlling trick mode playback speeds. It will be apparent, however, to one skilled in the art that the present methods and systems may be practiced without these specific details. Reference in the specification to "one embodiment" or "an embodiment" means that a particular feature, structure, or characteristic described in connection with the embodiment is included in at least one embodiment. Appearances of the phrase "in one embodiment" in various places in the specification are not necessarily all referring to the same embodiment.

II. Set-Top Box Configuration

Figure 1:
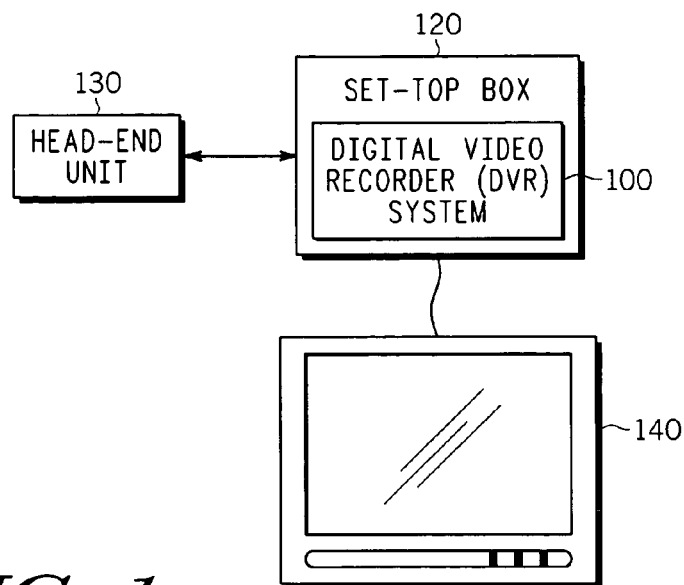
FIG. 1 is a block diagram illustrating a digital video recording (DVR) system implemented in a set-top box configuration, according to one embodiment.

FIG. 1 is a block diagram illustrating a digital video recording (DVR) system (100) implemented in a set-top box configuration, according to one embodiment. As shown in FIG. 1, a set-top box (120) includes the DVR system (100). The set-top box (120) is in communication with a head-end unit (130) and a presentation device (140). The set-top box (120) is configured to receive programming signals from the head-end unit (130), which programming signals may carry audio-visual content such as television or other types of programs. The received programming signals may carry MPEG-2 program and/or transport streams, which include elementary video streams having a number of sequentially orders video frames.

The DVR system (100) is configured to directly record (i.e., store) received programming content, using known techniques. The DVR system (100) and set-top box (120) may then work together to play back the recorded programming content for viewing on the presentation device (140). Each of the elements shown in FIG. 1 will now be described in detail.

A. Head-End Unit

The head-end unit (130) can include any device or groups of devices capable of transmitting programming content to the set-top box (120). In one embodiment, the head-end unit (130) includes a cable head-end known to those skilled in the art. In an alternative embodiment, the head-end unit (130) includes a satellite head-end known to those skilled in the art. Transmission of programming content from the head-end unit (130) to the set-top box (120) can be performed over any communication medium(s) known to those skilled in the art.

B. Set-Top Box

The set-top box (120) can include any device or devices useful for receiving programming content from the head-end unit (130) and providing the programming content to the presentation device (140) for viewing. The set-top box (120) may be configured to receive and process cable, satellite, or other types of programming signals. The set-top box (120) may be a DCT62XX series or DCT64XX series advanced set-top box provided by Motorola, Inc. For example, in one embodiment, the set-top box (120) is a DCT6416 advanced set-top box provided by Motorola, Inc.

C. DVR System

As shown in FIG. 1, the set-top box (120) may include the DVR system (100). The DVR system (100) is configured to directly record (i.e., store) programming content received by the set-top box (120), using known techniques. In one embodiment, MPEG-2 transport or program streams carrying the programming content (in the form of elementary video and audio streams) are stored to a hard disc drive (not shown; see (320) of FIG. 3) of the DVR system (100).

Figure 3:
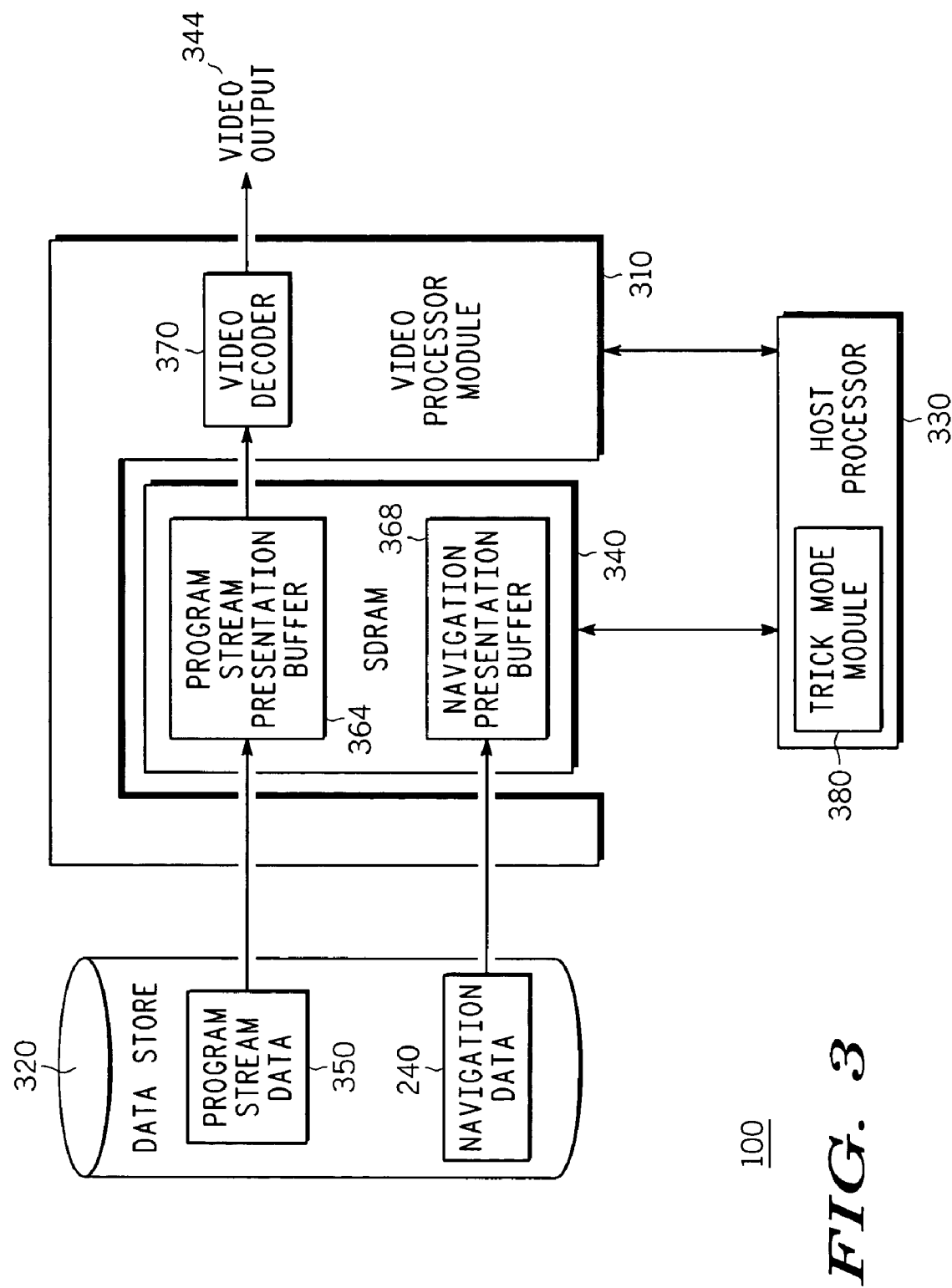
FIG. 3 is a block diagram illustrating a playback path of the DVR system of FIG. 1, according to one embodiment.

Along with storing programming content, the DVR system (100) is further configured to generate and store navigational data associated with the programming content. For example, a host processor (not shown; see (330) of FIG. 3) can be configured to record the navigational data. The generated navigational data may be stored to the hard disc drive (320; FIG. 3) of the DVR system (100).

In one embodiment, the navigational data is generated and stored during the recording of the programming content. However, generation of the navigational data is not limited to generation during a recording event. For example, the navigation data may be generated during playback of stored programming content.

The navigation data can include any information useful for quickly and conveniently navigating and accessing the stored MPEG-2 stream data during, or in preparation for, trick mode playback. In particular, the navigation data allows specific points or portions of the stored elementary video streams to be quickly identified and accessed, which helps enable I-frame trick play modes, as well as the maintaining of I-frame trick mode playback speeds as discussed in detail below.

Figure 2:
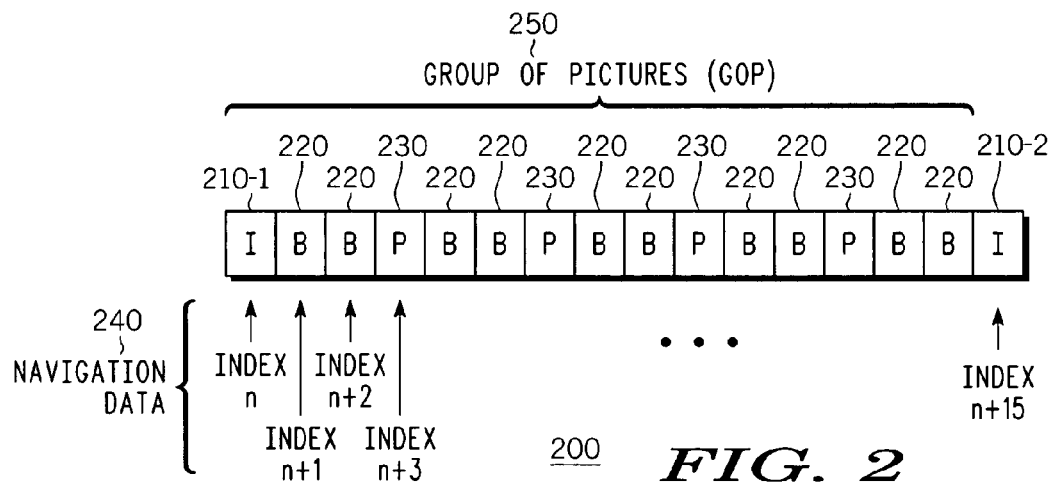
FIG. 2 is a block diagram illustrating frames of a segment of a directly recorded MPEG-2 elementary video stream and associated navigation data generated by the DVR system of FIG. 1, according to one embodiment.

In one embodiment, the generated navigational data includes indices associated with video frames of MPEG-2 elementary video streams. FIG. 2 is a block diagram illustrating video frames (210-1, 210-2, 220, and 230) of a segment (200) of a directly recorded MPEG-2 elementary video stream and associated navigation data (240). As shown in FIG. 2, the navigation data (240) can include indices (Index n, Index n+1, . . . Index n+15) associated with the video frames. The indices (Index n, Index n+1, . . . Index n+15) include pointers that point to the associated video frames. As shown in FIG. 2, the indices (Index n, Index n+1, . . . Index n+15) have index values that increment according to the sequential order of the frames, thereby identifying the sequential structure of the video frames of the video stream.

In addition to pointers to video frames, the navigation data (240) includes information (not shown) that identifies the type of video frame. For example, each of the indices (Index n, Index n+1, . . . Index n+15) may include data that identifies whether the associated frame is an I, B, or P frame. As discussed below in detail, the navigation data (240), including pointers and frame-type identifiers, supports I-frame trick play modes by enabling the monitoring and determination of GOP sizes in video streams. An example of a GOP (250) is shown in FIG. 2. The size of the GOP (250) shown in FIG. 2 is fifteen frames.

D. Presentation Device

Returning now to FIG. 1, the DVR system (100) and set-top box (120) are capable of providing stored programming content to the presentation device (140) for playback. The presentation device (140) may include a television, monitor, or other known audio and/or visual presentation devices. In particular, the DVR system (100) enables I-frame trick mode playback on the presentation device (140). The programming content of I-frames is processed and provided through the set-top box (120) to the presentation device (140) for viewing. Thus, viewers are able to view the content of I-frames being displayed during trick play modes (e.g., fast forward, slow forward, fast rewind, slow rewind, etc.).

While FIG. 1 illustrates one particular application of the DVR system (100), it will be appreciated by those skilled in the art that the system (100) may be implemented in different applications and in a variety of different configurations. For example, in some alternative embodiments, the set-top box (120) and/or the DVR system (100) are integrated with the presentation device (140). In other alternative embodiments, the DVR system (100) is separate from and communicatively coupled to the set-top box (120), which allows the DVR system (100) to function as a video server for one or more set-top boxes (120).

III. System Playback Path

FIG. 3 is a block diagram illustrating a playback path of the DVR system (100), according to one embodiment. As shown in FIG. 3, a video processor module (310) is in communication with a data store (320), a host processor (330), and a synchronous dynamic random access memory (SDRAM) unit (340). The video processor module (310), data store (320), host processor (330), and SDRAM unit (340) are configured to interact to access and process programming content stored in the data store (320) and generate program output data streams (e.g., video output (344)) from the programming content for playback. In particular, program output data streams can be generated for trick play modes, including I-frame trick play modes. Audio-related output paths are not shown because trick play modes typically mute audio content during trick mode playback. The devices shown in FIG. 3 will now be described in more detail.

A. Data Store

The data store (320) includes transport or program stream data (350) (collectively "program stream data (350)") and navigation data (240) that has been stored by the DVR system (100) as discussed above. The program stream data (350) includes programming content, including one or more MPEG-2 elementary video streams that have been directly recorded to the data store (320) and carry video programming content.

The data store (320) may include any memory device or devices known in the art that are capable of storing and accessing the program stream (350) and navigation (240) data. In one embodiment, the data store (120) includes one or more hard-disc drives.

For trick mode playback of stored programming content, the host processor (330) accesses the video stream data and navigation data (240) in the data store (320) and presents the video stream data to the video decoder (370) of the video processor module (310) by way of the SDRAM (340). Any suitable known communication interface may be used to provide data communication between the data store (320) and the video processor module (310), including a peripheral component interface (PCI).

B. SDRAM

As shown in FIG. 3, the video processor module (310) causes the accessed program stream data (350) to be sent to a program stream presentation buffer (364) of a the SDRAM unit (340). Similarly, the video processor module (310) causes the accessed navigation data (240) to be transmitted to a navigation presentation buffer (368) of the SDRAM unit (340). The buffers (364 and 368) are configured to buffer the navigation data (240) and the frames of the program stream data (350) according to known buffering techniques such that the data is made available to the video processor module (310) and host processor (330) at suitable times.

C. Video Processor Module

The video processor module (310) can include known graphics cards or other graphics-related hardware device. In one embodiment, the video processor module (310) comprises a BCM7030 multi-core device provided by Broadcom Corporation of Irvine, Calif.

The video processor module (310) includes a video decoder (370) configured to decode video frames of the elementary video streams of the transport/program stream data (350). Once the frames are decoded by the video decoder (370), the frames are sent to known output generation devices (not shown) such as a display engine and video encoder, which generate video output (344) in a format that can be used by the set-top box (120; FIG. 1) and/or presentation device (120; FIG. 1) for displaying the programming content of the frames.

For normal playback mode (i.e., playback of video streams at normal speed), all of the video frames of the video streams are simply sent to the video decoder (370) to be decoded for use in generating video output (344).

For I-frame trick play modes, only the I-frames of the video streams are provided to the video decoder (370) to be decoded for use in generating video output (344). The selective provisioning of I-frames to the video decoder (370) is performed by the host processor (330) as described below.

D. Host Processor

As mentioned above, for I-frame trick play modes, only the I-frames of video stream data are provided to the video decoder (370) to be decoded and generated into video output for presentation. The host processor (330) includes a trick mode module (380) configured to identify I-frames and instruct the video processor module (310) to provide only the identified I-frames to the video decoder (370). To identify the I-frames, the trick mode module (380) may use the navigation data (240) to determine the frame-types of the video frames.

In some cases, not all I-frames will be provided to the video decoder (370). The trick mode module (380) is configured to control which of the identified I-frames of a video stream will be provided to the video decoder (370). In particular, the trick mode module (380) is configured to set a trick mode play speed parameter, referred to as frame skip count (FSC), to define which I-frames will be presented to the video decoder (370). The FSC defines how many I-frames forward or backward from the currently processed I-frame to jump to determine the next I-frame to be processed. That is, the FSC may indicate not to skip any I-frames, or to skip one or more I-frames during I-frame trick play modes. The FSC value is determined and set such that a selected trick mode play speed will be maintained by skipping forward or backward by the determined FSC value.

For normal playback speed, the FSC is set to a normal playback speed setting, which is typically a value of "1." A value of "1" for the FSC indicates that no I-frames will be skipped over. In other words, every I-frame in a video stream will be provided to the video decoder (370).

For trick mode play speeds, the trick mode module (380) is configured to set the FSC value based on the GOP sizes of a video stream and the selected trick mode play speed. The trick mode module (380) is able to determine the GOP size in real time by monitoring the navigation data (240). Specifically, the trick mode module (380) determines the GOP size of each GOP (250; FIG. 2) by calculating the absolute value of the difference of index values for consecutive I-frames. The difference represents the number of video frames from a first I-frame to the next sequential I-frame in a video stream. For example, FIG. 2 shows consecutive I-frames (210-1 and 210-2) in an elementary video stream segment (200). The I-frames are identified by Index(n) and Index(n+15), respectively. The difference between these two consecutive I-frame indices is calculated by subtracting one from the other and taking the absolute value. When Index(n) is subtracted from Index(n+15), the result is a value of fifteen, which defines the GOP size (i.e., the number of frames between the consecutive I-frames (210-1 and 210-2)).

Having monitored and determined the GOP size, the trick mode module (380) can calculate a value of FSC based on the GOP size. For trick mode play speeds less than the determined GOP size of a segment (200; FIG. 2) of a video stream, the trick mode module (380) will set the FSC value to a normal playback speed value (e.g., "1") because the selected trick mode playback speed can be maintained without skipping over any I-frames. For example, if the selected trick mode playback speed is five times faster (i.e., 5×) than normal playback speed and the GOP size is determined to equal fifteen frames, the playback speed is less than the GOP size, which means that the playback speed of 5× can be maintained without skipping over any I-frames. In this case, the trick mode module (380) will instruct the video decoder (370) to present every I-frame to the video decoder (370).

Conversely, for trick mode playback speeds greater than or equal to the determined GOP size of a segment (200; FIG. 2) of a video stream, the trick mode module (380) is configured to calculate the number of I-frames by which to skip forward (or backward for reverse direction trick play modes) in order to maintain the selected trick mode playback speed. This calculation is based on the determined GOP size and is defined as Equation 1:

Equation 1:
$$FSC = \frac{TrickModePlaybackSpeed}{GOPSize}$$

Figure 4:
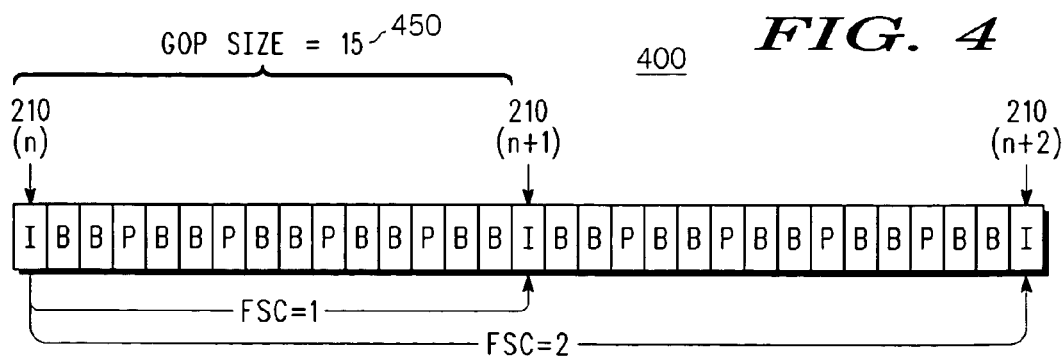
FIG. 4 is a block diagram illustrating relationships of a trick mode play speed parameter to video frames of an MPEG-2 elementary video stream segment, according to one embodiment.

FIG. 4 is a block diagram illustrating relationships of FSC values to video frames of a video stream, according to one embodiment. As shown in FIG. 4, when the FSC value is set to "1" for a forward direction trick play mode, the host processor (330) will instruct the video processor module (310) to skip forward from a first I-Frame (210($n$)) to the next sequential I-frame (210($n$+1)), thereby causing I-frame (210($n$+1)) to be presented to the video decoder in sequence after the I-frame (210($n$)). When the FSC value is set to "2," the host processor (330) will instruct the video processor module (310) to skip forward two I-frames to I-frame (210($n$+2)). This causes I-frame (210($n$+1)) to be skipped over so that it will not be presented to the video decoder (370). I-frame (210($n$+2)) will then be presented to the video decoder (370) immediately subsequent to I-frame (210($n$)). For a backward direction trick play mode, the host processor (330) instructs a backward skipping of I-frames in similar fashion.

By being able to not present every I-frame of a video stream to the video decoder (370; FIG. 3), the system (100; FIG. 1) is able to support high-speed trick mode playback speeds even when the playback speeds are greater than the determined GOP sizes of segments (200; FIG. 2) of a video stream. The number of I-frames by which to skip forward or backward is calculated based on the GOP size, which calculation determines the number of I-frames by which to skip forward or backward in a video stream in order to best maintain a selected trick mode play speed.

For example, FIG. 4 illustrates a video stream segment (400) having consecutive GOPs with GOP sizes (450) equal to 15 frames. If a trick mode playback speed of 15× normal playback speed is selected, the trick mode module (380) will calculate the FSC value to equal "1," meaning that each I-frame will be presented to the video decoder (370) in order to maintain the selected trick mode playback speed. Alternatively, if a trick mode playback speed of 30× normal playback speed is selected, the trick mode module (380) will calculate the FSC value to equal "2," thereby causing only every other I-frame (e.g., I-frames 10($n$) and 10($n$+2)) to be presented to the video decoder (370). This allows the system (100) to maintain the selected trick mode playback speed by controlling frame presentation.

Returning now to FIG. 3, the trick mode module (380) is further configured to determine whether and how many times the video content of an I-frame should be presented for display in order to maintain a selected trick mode playback speed. When the trick mode playback speed is less than the GOP size (450; FIG. 4), the playback speed can be maintained by repeatedly displaying the content of I-frames a number of times. The video decoder (370) is configured to repeat the processing of each video frame it receives the number of times defined by a frame repeat count (FRC) variable. The trick mode module (380) is able to control the number of repetitions of I-frames by calculating an FRC value and having the host processor (330) set an FRC register of the video decoder (370) to the calculated FRC value.

When the trick mode module (380) determines that a selected trick mode playback speed is less than the current GOP size of a video stream segment, the trick mode module (380) can calculate and set the FRC value in order to define the number of times each frame will be repeated in the video decoder (370). The FRC calculation is designed to determine an optimum repeat value that will maintain the selected trick mode playback speed. The calculation is based on GOP size and is defined as Equation 2:

Equation 2:
$$FRC = \frac{GOPSize}{TrickModePlaySpeed}$$

By way of example, if the selected trick mode playback speed is four times (4×) normal speed and the GOP size is determined to be fifteen frames, then the trick mode module (380) will calculate the FRC value to equal the quotient of fifteen divided by four. Because the FRC is typically an integer value, the FRC will generally be rounded down to the nearest integer, meaning the FRC will be set to a value of "3" for this example. The host processor (330) instructs the video decoder (370) to set the FRC to "3," which causes the video decoder to repeat each received I-frame three times. By repeating each I-frame the number of times defined by the FRC value, the system (100; FIG. 1) is able to fill display time with repeated frames, which allows the selected trick mode playback speed to be maintained when the playback speed is less than the GOP size, and even when the GOP size changes in a video stream during playback.

Because the trick mode module (380) is configured to continuously monitor GOP size and dynamically control FSC and FRC values, the system (100; FIG. 1) is able to dynamically control trick mode playback speeds based on changing GOP sizes in a video stream. The real-time monitoring of GOP size and corresponding calculation of the FSC and FRC will be further discussed below with reference to FIGS. 5 and 6.

The trick mode module (380) and its processes can be implemented as computer-readable instructions that are capable of being performed by the host processor (330). Any type of computer-readable medium known in the art may be used to carry the instructions. The instructions may be in the form of software, firmware, embedded code, microcode, hardware processes, and the like. The host processor (330) can perform the instructions to monitor and determine GOP sizes in real-time, calculate trick mode playback speed parameters (e.g., FRC and/or FSC) based on the determined GOP sizes, and control frame presentation (e.g., frame repeating and/or frame skipping) based on the trick mode playback speed parameters. The trick mode module (380) can be configured to perform any of the steps shown in FIGS. 5 and 6.

IV. Exemplary Process Flows

FIG. 5 is a flowchart illustrating a method for controlling trick mode playback speed, according to one embodiment. The method begins by processing a video frame index at step (510). As discussed above, the index associated with a particular video frame can be accessed in the navigation data (240; FIG. 2). By processing the index, the system (100; FIG. 1) is able to access a frame-type identifier, an index value indicative of the position of the associated video frame in the video stream, and a pointer to the associated video frame.

At step (520), it is determined whether the video frame index is an I-frame index. In other words, at step (520), I-frames are identified by processing an index to determine the type of video frame to which the index is associated. If it is determined at step (520) that the index is not an I-frame index, processing returns to step (510), at which step the next sequential video frame index will be processed.

On the other hand, if it is determined at step (520) that the video frame index is an I-frame index, processing moves to step (524), at which step the GOP size associated with the I-frame index is calculated. The GOP size is determined by calculating the absolute value of the difference in index values of the current I-frame index and the previous I-frame index as discussed above in relation to FIGS. 2 and 3. If there is no previous I-frame index available, a default value may be used until sufficient data has been processed to enable calculation of the GOP size.

Processing then moves to step (528), at which step it is determined whether the calculated GOP size is different than the current GOP size setting. In other words, it is determined whether the GOP size has changed. If it is determined that the GOP size has not changed compared to the currently implemented GOP size setting, trick mode playback speed parameters will not be recalculated, and processing returns to step (510) for processing of the next sequential video frame index.

On the other hand, if it is determined at step (528) that the calculated GOP size is different than the current GOP size setting, processing moves to step (532). At step (532), it is determined whether the number of consecutive occurrences of equivalent calculated GOP sizes has reached a predetermined threshold. Step (532) is designed to apply a filter before updating trick mode playback speed parameters. The filter can be designed to filter out any temporary or normal discontinuities in GOP size that may not warrant a change to playback speed parameters, such as GOP size discontinuities caused by normal scene changes.

To implement the filter, a counter can be included in the system (100; FIG. 1) to track the consecutive occurrences of equivalent GOP sizes in a video stream. When the number of consecutive occurrences has reached a predetermined threshold, the system (100; FIG. 1) recognizes that the change in GOP size is not just a normal discontinuity. The system (100; FIG. 1) can then update trick mode speed parameters based on the GOP size. The filter at step (532) allows the system (100; FIG. 1) to update trick mode play speed parameters only when changes in GOP size have some measure of permanency. In one embodiment, the predetermined threshold is set at a value of four consecutive occurrences of an equivalent GOP size. This value allows the system (100; FIG. 1) to filter out any temporary discontinuities in GOP size, without unnecessarily updating play speed parameters. Thus, if it is determined at step (532) that the predetermined threshold has not been reached, processing returns to step (510) for processing of the next sequential video frame index.

On the other hand, if it is determined at step (532) that the predetermined threshold has been reached, processing moves to step (536). At step (536), trick mode playback speed parameters are calculated based on the calculated GOP size. Step (536) can include calculating the FRC and/or FSC parameters in accordance with Equations 1 and 2 as discussed above. The calculation of FRC and FSC parameters at step (536) will be further discussed with reference to FIG. 6.

Once the trick mode playback speed parameters have been calculated at step (536), processing moves to step (540). At step (540), the calculated trick mode playback speed parameters are implemented. For the FSC parameter, the trick mode module (380); FIG. 3) is configured to use the value of the FSC parameter to determine which I-frames of an elementary video stream will be sent to the video decoder (370; FIG. 3). For the FRC parameter, the host processor (330; FIG. 3) instructs the video decoder (370; FIG. 3) to update the FRC setting of the video decoder (370; FIG. 3) with the calculated FRC value. As known to those skilled in the art, the video decoder (370; FIG. 3) is able to repeat frames at a rate that is based on the FRC value.

Once the calculated trick mode play speed parameters have been implemented at step (540), processing returns to step (510) for processing of the next sequential video frame index. Accordingly, the steps shown in FIG. 5 form a frame control loop for controlling frame presentation (e.g., skip and/or repeat rates of frames) based on GOP size. By controlling frame presentation, trick mode playback speeds can be dynamically maintained, even when the GOP size changes during trick mode playback.

Figure 6:
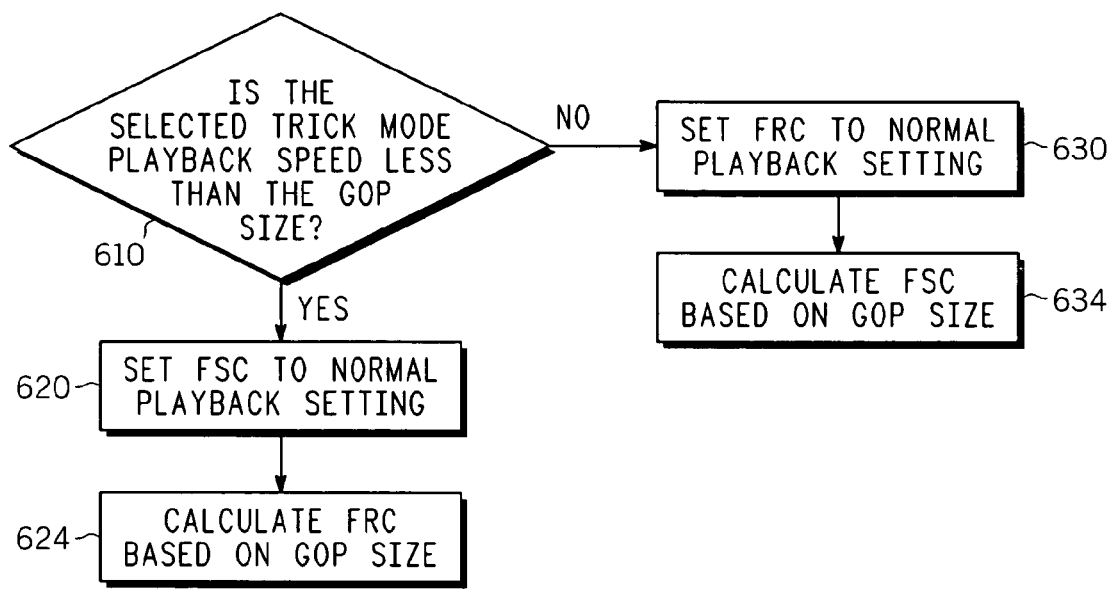
FIG. 6 is a flowchart illustrating a method for calculating trick mode play speed parameters in the method of FIG. 5, according to one embodiment.

FIG. 6 is a flowchart illustrating a method for calculating trick mode play speed parameters based on GOP size, according to one embodiment. At step (610), it is determined whether the selected trick mode playback speed is less than the GOP size. If it is determined at step (610) that the selected trick mode playback speed is less than the GOP size, processing moves to step (620). At step (620), the FSC is set to a normal playback value (e.g., a value of "1"). Processing then moves to step (624), at which step a value for the FRC is calculated using Equation 2, as discussed above.

On the hand, if it is determined at step (610) that the selected trick mode playback speed is greater than or equal to the GOP size, processing moves to step (630). At step (630), the FRC is set to a normal playback value (e.g., a value of "1"). Processing then moves to step (634), at which step a value for the FSC is calculated using Equation 1, as discussed above.

By determining whether the selected trick mode playback speed is less than the GOP size, the system (100; FIG. 1) is able to identify which trick mode play speed parameter to calculate and implement in order to maintain a selected play speed. As discussed above, when the selected play speed is less than the GOP size, I-frames may be repeated at a rate specified by the FRC in order to maintain the selected play speed for the determined GOP size. Conversely, when the selected play speed is greater than the GOP size, I-frames may be selectively skipped over (i.e., not provided to the video decoder) at a rate specified by the FSC in order to maintain the selected play speed for the determined GOP size.

V. Conclusion

In conclusion, the present methods and systems provide for dynamically controlling trick mode playback speeds based on GOP sizes. GOP size is monitored and changes in the GOP size detected during trick mode playback. The detected GOP size can then be used to dynamically calculate trick mode play speed parameters (e.g., FRC and FSC) that may be implemented to maintain a particular trick mode playback speed even as GOP size changes. With the present systems and methods, users of the system (100; FIG. 1) can expect and experience consistent trick mode play speeds for I-frame trick modes. For example, changes in GOP size within a video stream due to transitions from standard definition to high definition will not slow down trick mode playback (e.g., an I-frame fast forward trick mode) because playback parameters are dynamically set to compensate for such changes in GOP size. Further, special recording formats and algorithms are not needed to build a uniform GOP size during recording of programming content. Further,

V. Alternative Embodiments

The preceding description has been presented only to illustrate and describe the present methods and systems. It is not intended to be exhaustive or to limit the present methods and systems to any precise form disclosed. Many modifications and variations are possible in light of the above teaching. For example, the above systems and methods can be used in any application in which digital video content represented by frames in a video stream (e.g., an MPEG-2 elementary video stream) is recorded and played back by selective-frame trick play modes.

The foregoing embodiments were chosen and described in order to illustrate principles of the methods and systems as well as some practical applications. The preceding description enables others skilled in the art to utilize the methods and systems in various embodiments and with various modifications as are suited to the particular use contemplated. It is intended that the scope of the methods and systems be defined by the following claims.

What is claimed is:

1. A method used in a system for controlling trick mode playback speed, the method comprising:
    monitoring a plurality of frame indices associated with a plurality of frames of a digital video stream;
    dynamically determining a new Group-of-Pictures (GOP) size associated with each of a plurality of I frames included in said plurality of frames, based on at least a subset of said plurality of frame indices;
    comparing the new GOP size to a selected trick mode playback speed;
    when the new GOP size is less than the selected trick mode playback speed,
        calculating a new value for a Frame Skip Count (FSC) parameter indicating skipping of at least one I-frame, said new value being based on said new GOP size, and
        dynamically controlling frame presentation based on said new value of FSC;
    when the new GOP size is more than the desired trick mode playback speed,
        calculating a new value for a Frame Repeat Count (FRC) parameter indicating repetition of at least one I-frame, said new value being based on said new GOP size; and
        dynamically controlling frame presentation based on said new value of FRC.

2. The method of claim 1, wherein said plurality of frames includes a plurality of I-frames, including a first I-frame and a second I-frame, and said plurality of indices includes a first I-frame index associated with said first I-frame and a second I-frame index associated with said second I-frame.

3. The method of claim 1, wherein said new value of FSC is defined as the trick mode playback speed divided by said new GOP size.

4. The method of claim 1, wherein said plurality of frames includes a plurality of I-frames, and wherein said step of dynamically controlling frame presentation based on said new value of FSC includes skipping forward or backward a number of said plurality of I-frames, said number being defined by said new value of FSC.

5. The method of claim 4, wherein said step of dynamically controlling frame presentation based on said new value of FSC includes presenting only a subset of said plurality of I-frames to a video decoder, said subset being defined by said new value of FSC.

6. The method of claim 1 wherein said new value of FRC is defined as said new GOP size divided by the trick mode playback speed.

7. The method of claim 1 wherein said step of dynamically controlling frame presentation based on said new value of FRC includes repeatedly presenting at least one of said plurality of frames for display for a number of iterations, said number of iterations being defined by said new value of FRC.

8. The method of claim 1 wherein said step of dynamically controlling frame presentation based on said new value of FSC includes presenting select frames of said plurality of frames to a video decoder, said select frames being determined based on said new value of FSC.

9. The method of claim 1 wherein said step of dynamically controlling frame presentation based on said new value of FRC includes repeatedly outputting select frames of said plurality of frames for display, the number of repetitions being based on said FRC.

10. The method of claim 1, wherein said step of monitoring is performed in real-time.

11. The method of claim 1, wherein said step of dynamically determining said new GOP size includes determining whether a calculated GOP size is different from a current GOP setting by comparing a number of consecutive occurrences of equivalent calculated GOP sizes in a video stream to a threshold.

12. A method used in a system for controlling trick mode playback speed, the method comprising:
    monitoring a plurality of frame indices associated with a plurality of frames of a digital video stream;
    determining a Group-of-Pictures (GOP) size based on at least a subset of said plurality of frame indices;
    calculating at least one trick mode play speed parameter based on said GOP size; and
    controlling frame presentation based on said at least one trick mode play speed parameter;
    wherein said plurality of frames includes a plurality of I-frames, including a first I-frame and a second I-frame, and said plurality of indices includes a first I-frame index associated with said first I-frame and a second I-frame index associated with said second I-frame; and
    wherein said step of determining said GOP size includes calculating a difference between said first I-frame index and said second I-frame index.

13. A method used in a system for controlling trick mode play speed, the method comprising:

monitoring navigation data associated with a plurality of video frames in a digital video stream, said plurality of video frames including a plurality of I-frames;

iteratively determining a Group-of-Pictures (GOP) size for consecutive pairs of said I-frames;

tracking a number of consecutive occurrences of said determined GOP size when said determined GOP size is different than a current GOP size setting;

determining whether said number of consecutive occurrences of said determined GOP size reaches a predetermined threshold;

calculating at least one trick mode play speed parameter based on said determined GOP size when said number of consecutive occurrences reaches said predetermined threshold; and controlling frame presentation based on said at least one trick mode play speed parameter.

14. The method of claim 13, wherein said navigation data includes a plurality of indices associated with said plurality of I-frames, and wherein said step of iteratively determining said GOP size includes calculating a difference between a subset of said plurality of indices, said subset being associated with said consecutive pairs of said I-frames.

15. The method of claim 13, wherein said step of calculating said at least one trick mode play speed parameter includes calculating a frame skip count (FSC).

16. The method of claim 15, wherein said FSC is defined as the trick mode playback speed divided by said determined GOP size.

17. The method of claim 15, wherein said step of controlling frame presentation includes skipping forward or backward a number of said plurality of I-frames, said number being defined by said FSC.

18. The method of claim 17, wherein said step of controlling frame presentation includes presenting only a subset of said plurality of I-frames to a video decoder, said subset being defined by said FSC.

19. The method of claim 13, wherein said step of calculating said at least one trick mode play speed parameter includes calculating a frame repeat count (FRC).

20. The method of claim 19, wherein said FRC is defined as said determined GOP size divided by the trick mode playback speed.

21. The method of claim 19, wherein said step of controlling frame presentation includes repeatedly presenting at least one of said plurality of I-frames for display for a number of iterations, said number of iterations being defined by said FRC.

22. The method of claim 13, wherein said step of calculating said at least one trick mode play speed parameter includes:

determining whether said determined GOP size is less than the trick mode playback speed;

calculating a frame repeat count (FRC) when said step of determining determines that the trick mode playback speed is less than said determined GOP size; and calculating a frame skip count (FSC) when said step of determining determines that the trick mode playback speed is greater than or equal to said determined GOP size.

23. The method of claim 22, wherein said step of controlling frame presentation includes presenting select frames of said plurality of frames to a video decoder, said select frames being determined based on said FSC.

24. The method of claim 22, wherein said step of controlling frame presentation includes repeatedly outputting select frames of said plurality of frames for display, the number of repetitions being based on said FRC.

25. A computer readable medium encoded with computer executable instructions for controlling trick mode playback speed, said instructions being configured to instruct a processor to perform the steps of:

monitoring a plurality of frame indices associated with a plurality of frames of a digital video stream;

dynamically determining a new Group-of-Pictures (GOP) size associated with each of a plurality of I frames included in said plurality of frames, based on at least a subset of said plurality of frame indices;

comparing the new GOP size to a selected trick mode playback speed;

when the new GOP size is less than the selected trick mode playback speed, calculating a new value for a Frame Skip Count (FSC) parameter indicating skipping of at least one I-frame, said new value being based on said GOP size, and dynamically controlling frame presentation based on said new value of FSC; and when the new GOP size is more than the desired trick mode playback speed, calculating a new value for a Frame Repeat Count (FRC) parameter indicating repetition of at least one I-frame, said new value being based on said GOP size, and dynamically controlling frame presentation based on said new value of FRC.

26. The computer readable medium of claim 25, wherein said plurality of frames includes a plurality of I-frames, including a first I-frame and a second I-frame, and said plurality of indices includes a first I-frame index associated with said first I-frame and a second I-frame index associated with said second I-frame.

27. The computer readable medium of claim 26, wherein said step of determining said new GOP size includes calculating a difference between said first I-frame index and said second I-frame index.

28. The computer readable medium of claim 25, wherein said FSC is defined as the trick mode playback speed divided by said new GOP size.

29. The computer readable medium of claim 25, wherein said plurality of frames includes a plurality of I-frames, and wherein said step of dynamically controlling frame presentation includes skipping forward or backward a number of said plurality of I-frames, said number being defined by said FSC.

30. The computer readable medium of claim 25, wherein said step of dynamically controlling frame presentation based on said new value of FSC includes presenting only a subset of said plurality of I-frames to a video decoder, said subset being defined by said FSC.

31. The computer readable medium of claim 25, wherein said new value of FRC is defined as said new GOP size divided by the trick mode playback speed.

32. The computer readable medium of claim 25, wherein said step of dynamically controlling frame presentation based on said new value of FRC includes repeatedly presenting at least one of said plurality of frames for display for a number of iterations, said number of iterations being defined by said new value of FRC.

33. The computer readable medium of claim 25, wherein said step of dynamically controlling frame presentation based on said new value of FSC includes presenting select frames of said plurality of frames to a video decoder, said select frames being determined based on said new value of FSC.

34. The computer readable medium of claim 25, wherein said step of dynamically controlling frame presentation based on said new value of FRC includes repeatedly outputting select frames of said plurality of frames for display, the number of repetitions being based on said new value of FRC.

35. A system for controlling trick mode playback speed, the system comprising:
- a data store for storing a digital video stream and navigation data for navigating said digital video stream, said digital video stream including a plurality of I-frames;
- a video processor module in communication with said data store and configured to access said digital video stream, said video processor module including a video decoder configured to decode said plurality of I-frames; and
- a trick mode module in communication with said video processor module, said trick mode module begin configured to:
  - access said digital video stream and said navigation data;
  - monitor said navigational data to iteratively determine a Group-of-Pictures (GOP) size associated with each of said plurality of I-frames;
  - calculate at least one trick mode play speed parameter based on said GOP size; and
  - control presentation said plurality of I-frames based on said trick mode play speed parameter.

36. The system of claim 35, wherein said navigational data includes a plurality of indices associated with said plurality of I-frames, and wherein said trick mode module is configured to determined said GOP size by calculating a difference between a pair of said indices associated with a pair of consecutive said I-frames.

37. The system of claim 35, wherein said at least one trick mode play speed parameter includes a frame-repeat count (FRC) and a frame-skip count (FSC).

38. The system of claim 37, wherein said FRC is defined as said GOP size divided by the trick mode playback speed.

39. The system of claim 37, wherein said trick mode module is configured to control frame presentation by sending said FRC to said video decoder, said video decoder being configured to repeatedly process each of said plurality of I-frames a number of times, said number of times being defined by said FRC.

40. The system of claim 37, wherein said FSC is defined as the trick mode playback speed divided by said GOP size.

41. The system of claim 37, wherein said trick mode module is configured to control frame presentation by selectively presenting at least a subset of said plurality of I-frames to said video decoder, wherein said at least a subset of said plurality of I-frames is defined by said FSC.

\* \* \* \* \*